(12) United States Patent
Lin et al.

(10) Patent No.: US 11,493,787 B1
(45) Date of Patent: Nov. 8, 2022

(54) PROJECTION TYPE TRANSPARENT DISPLAY

(71) Applicant: NATIONAL SUN YAT-SEN UNIVERSITY, Kaohsiung (TW)

(72) Inventors: Tsung-Hsien Lin, Kaohsiung (TW);
Heng-Yi Tseng, Kaohsiung (TW);
Cheng-Chang Li, Kaohsiung (TW);
Li-Min Chang, Kaohsiung (TW);
Kuan-Wu Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 40 days.

(21) Appl. No.: 17/349,969

(22) Filed: Jun. 17, 2021

(30) Foreign Application Priority Data

May 19, 2021 (TW) .................................. 110118098

(51) Int. Cl.
| | | |
|---|---|---|
| *G02F 1/01* | (2006.01) | |
| *G02F 1/13363* | (2006.01) | |
| *G02F 1/139* | (2006.01) | |
| *G02F 1/137* | (2006.01) | |
| *G02F 1/1341* | (2006.01) | |
| *G02F 1/1335* | (2006.01) | |

(52) U.S. Cl.
CPC .......... *G02F 1/0136* (2013.01); *G02F 1/1341* (2013.01); *G02F 1/1396* (2013.01); *G02F 1/13706* (2021.01); *G02F 1/13712* (2021.01); *G02F 1/133528* (2013.01); *G02F 1/133638* (2021.01); *G02F 2202/06* (2013.01)

(58) Field of Classification Search
CPC ............. G02F 1/0136; G02F 1/133638; G02F 1/1396; G02F 1/133536; G02F 1/133543; G02F 1/133528; G02F 1/133541
See application file for complete search history.

(56) References Cited

U.S. PATENT DOCUMENTS

| | | | | |
|---|---|---|---|---|
| 2003/0137625 A1* | 7/2003 | Okazaki | ............ | G02F 1/133555 349/155 |
| 2005/0041009 A1* | 2/2005 | Kuroda | ............... | H01L 27/3244 345/102 |
| 2018/0026082 A1* | 1/2018 | Lee | ................... | G02F 1/133553 349/96 |

FOREIGN PATENT DOCUMENTS

| | | |
|---|---|---|
| CN | 105742319 A | 7/2016 |
| JP | 2005091744 A * | 4/2005 |

* cited by examiner

*Primary Examiner* — Jia X Pan
(74) *Attorney, Agent, or Firm* — WPAT, PC

(57) ABSTRACT

A projection type transparent display includes a polarization modulator and a reflective layer. The polarization modulator is stacked in sequence by a linear polarizer, a liquid crystal layer and a phase retarder. The reflective layer is stacked on the phase retarder. A projection light is incident on the linear polarizer to form a linearly polarized light. The liquid crystal layer changes a polarization direction of the linearly polarized light. Two kinds of linearly polarized projection lights with polarization directions orthogonal to each other are respectively formed and pass through the phase retarder to respectively form two kinds of circularly polarized projection lights with opposite rotation directions. A background light is incident on the reflective layer. A circularly polarized background light with the same spiral direction is reflected, and the circularly polarized background light opposite to the spiral direction passes through the reflective layer and is incident on the polarization modulator.

9 Claims, 5 Drawing Sheets

PROJECTION TYPE TRANSPARENT DISPLAY

CROSS REFERENCE TO RELATED APPLICATION

The application claims the benefit of Taiwan application serial No. 110118098, filed on May 19, 2021, and the entire contents of which are incorporated herein by reference.

BACKGROUND OF THE INVENTION

1. Field of the Invention

The present invention relates to an optical imaging technology and, more particularly, to a projection type transparent display capable of shielding background light interference while taking into account the transparency.

2. Description of the Related Art

Transparent display technology is used to display images on a transparent panel, through which background objects can be seen and the images can be viewed at the same time. The transparent display can be applied to showcases, shopping windows, billboards, etc. and replace ordinary glass. In addition to the transparent display purpose of the original glass, it can also display text and images to deliver information instantly and customarily. The existing transparent display technology can be divided into transmission type and projection type. The former is to replace the display panel material with a high-transmittance material, while the latter is to project the images on a transparent screen with reflective characteristics. In comparison, the manufacturing cost of the projection type transparent display is lower.

The conventional projection type transparent display achieves the functions of reflective projection and light transmission by means of surface microstructure, special optical film, or semi-transmissive and semi-reflective liquid crystal layer. However, the conventional projection type transparent display cannot shield most of the background light when performing projection imaging, which causes the projection to be interfered by the background light and reduces the image quality. If the transmittance of the projection layer is reduced to block the ambient light in order to improve the image quality, the transparency of the transparent display will be reduced when the transparent display is switched to the transparent state.

In light of this, it is necessary to improve the conventional projection type transparent display.

SUMMARY OF THE INVENTION

In order to solve the above-mentioned problems, it is an objective of this invention to provide a projection type transparent display, which can improve the image quality in the projection state.

It is another objective of the present invention to provide a projection type transparent display, which can achieve a clear and transparent glass effect in a transparent state.

It is yet another objective of the present invention to provide a projection type transparent display, which can switch between the projection and transparent states simply and quickly.

It is still an objective of the present invention to provide a projection type transparent display, which can reduce the manufacturing cost and process difficulty.

As used herein, the term "one", "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

A projection type transparent display of the present invention includes a polarization modulator and a reflective layer. The polarization modulator is stacked in sequence by a linear polarizer, a liquid crystal layer and a phase retarder. A projection light is incident on the linear polarizer to form a linearly polarized light, and the liquid crystal layer changes a polarization direction of the linearly polarized light, through whether an electric field is applied to the liquid crystal layer or not, two kinds of linearly polarized projection lights with polarization directions orthogonal to each other are respectively formed. The two kinds of linearly polarized projection lights pass through the phase retarder to respectively form two kinds of circularly polarized projection lights with opposite rotation directions. The reflective layer is stacked on the phase retarder of the polarization modulator. The reflective layer has a spiral structure with a spiral direction, the two kinds of circularly polarized projection lights transformed from the projection light are incident on the reflective layer, and a reflection is performed when the rotation direction of the circularly polarized projection light is the same as the spiral direction. The reflective layer is transmitted when the rotation direction of the circularly polarized projection light is opposite to the spiral direction. A background light is incident on the reflective layer, a circularly polarized background light with the same spiral direction is reflected, and a circularly polarized background light opposite to the spiral direction passes through the reflective layer and is incident on the polarization modulator, through whether an electric field is applied to the liquid crystal layer or not, two kinds of linearly polarized background lights with polarization directions orthogonal to each other are respectively formed. One of the two kinds of linearly polarized background lights is absorbed by the linear polarizer and another one of the two kinds of linearly polarized background lights passes through the linear polarizer.

Accordingly, the projection type transparent display of the present invention is carried out by switching the rotation direction of the circularly polarized light transformed from the projection light that has been adjusted by the polarization modulator, then by limiting the spiral direction of the reflective layer, the projection light can be switched between the reflection and transmission states, and corresponding to the shielding and transmission states of the background light. Thus, the projection state of shielding the interference of the background light and the transparent state of bidirectional clear and transparent glass effect can be simply controlled during the reflective projection imaging, without the need to use surface microstructure, special optical film or semi-transmissive and semi-reflective structure, etc., thereby achieving the effects of easy operation, reducing manufacturing cost and improving image quality.

In an example, an extension direction of a transmitting primary axis of the linear polarizer is a primary axis direction, the phase retarder is a quarter wave plate and an included angle between an optical axis direction of the phase retarder and the primary axis direction is 45 degrees. Thus, the phase retarder can transform linearly polarized light into the circularly polarized light, achieving the effect of regulating the reflection or transmission of the lights.

In an example, the liquid crystal layer is formed by two conductive and transparent substrates sandwiching twisted nematic liquid crystals, and a switchable electric field is applied between the two substrates. Thus, the liquid crystal layer can switch the states through switching the electric field, achieving the effect of regulating the optical action of the liquid crystals.

In an example, the twisted nematic liquid crystals of the liquid crystal layer are positive liquid crystals, an absence of the electric field can cause the liquid crystal to present a twisted arrangement, while an application of the electric field can cause the liquid crystals to arrange perpendicular to each of the substrates. Thus, the liquid crystal layer can twist the polarization direction of the light passing through when the power is off, achieving the effect of normal polarization rotation.

In an example, the twisted nematic liquid crystals of the liquid crystal layer are negative liquid crystals, an application of the electric field can cause the liquid crystals to present a twisted arrangement, while an absence of the electric field can cause the liquid crystals to arrange perpendicular to each of the substrates. Thus, when the electric field acts on the liquid crystal layer, the polarization direction of the light passing through can be twisted, achieving the effect of electrically controlling the polarization rotation.

In an example, the reflective layer is formed by injecting a liquid crystal material between two transparent substrates, and the spiral structure has a gradual pitch. Thus, the reflective layer with different pitches can reflect the light of different wavelengths, achieving the effect of reflecting light with broadband spectrum.

In an example, the liquid crystal material is cholesteric liquid crystal doped with polymerized palmar monomer, and refractive indices between the liquid crystal material and the polymer thereof do not match. Thus, the lights at different incident positions are not parallel to each other after reflection, achieving the effect of forming non-directional diffuse reflection.

In an example, when the polarization modulator transforms the rotation direction of the circularly polarized projection light to be the same as the spiral direction, the circularly polarized projection light is reflected by the reflective layer and the background light is absorbed by the linear polarizer, resulting in a projection state. Thus, when the reflective layer provides the projection imaging, the polarization modulator simultaneously shields the interference of the background light, achieving the effects of simple operation and improving the image quality.

In an example, when the polarization modulator transforms the rotation direction of the circularly polarized projection light to be opposite to the spiral direction, the circularly polarized projection light passes through the reflective layer and the background light passes through the linear polarizer, resulting in a transparent state. Thus, the light can pass through the polarization modulator and the reflective layer simultaneously, achieving the effect of transforming the display device into a clear and transparent glass.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
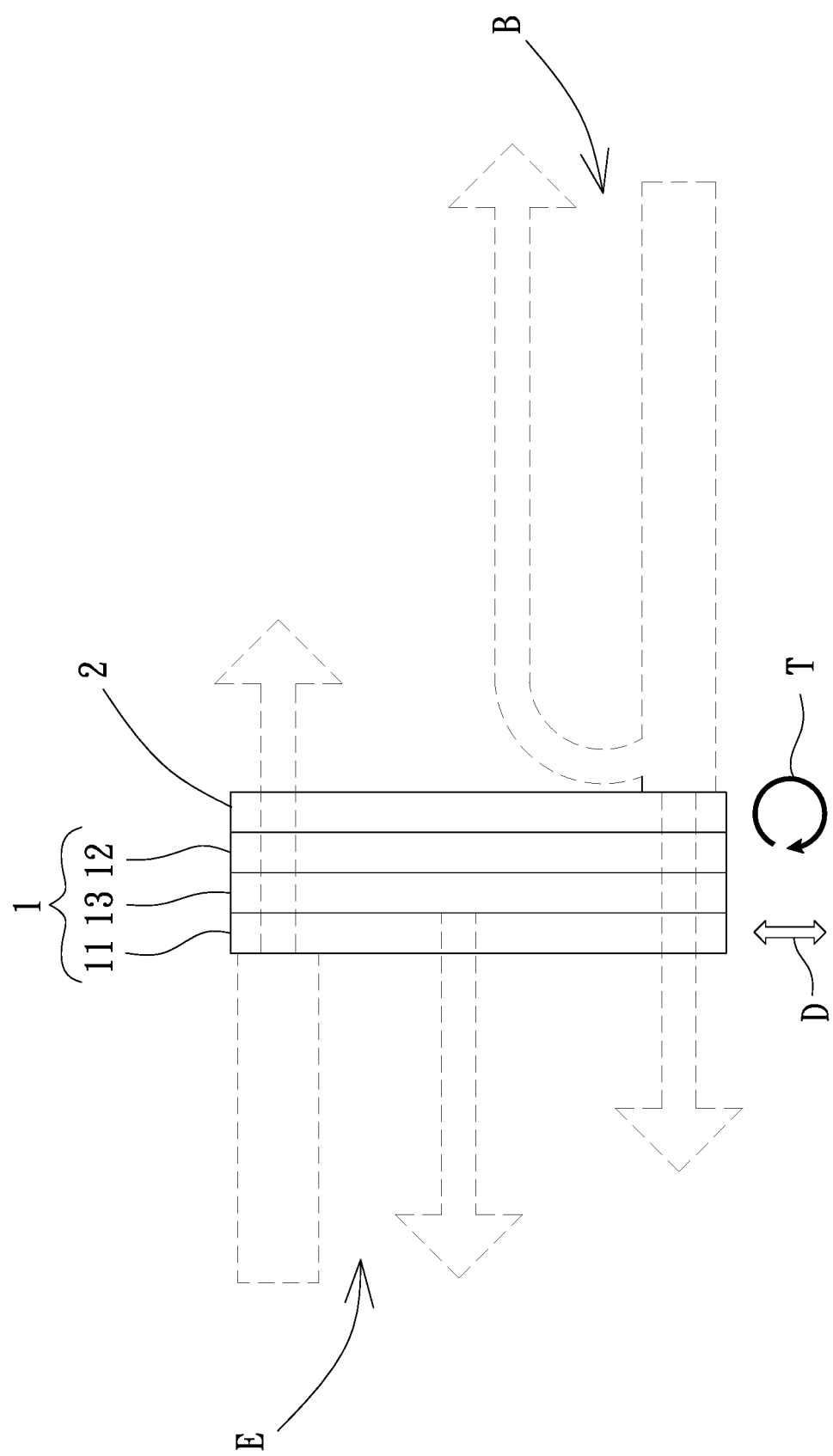
FIG. 1 is a laminated assembly diagram according to a preferred embodiment of the present invention.

Please refer to FIG. 1, which is a preferred embodiment of a projection type transparent display of the present invention. The projection type transparent display includes a polarization modulator 1 and a reflective layer 2. The polarization modulator 1 stacks on the reflective layer 2. A projection light E is incident on the polarization modulator 1 and then acts on the reflective layer 2, while another background light B is incident on the reflective layer 2 and then acts on the polarization modulator 1.

The polarization modulator 1 is composed of a linear polarizer 11 and a phase retarder 12 respectively stacked on two surfaces of a liquid crystal layer 13. The linear polarizer 11 has a transmitting primary axis, and an extension direction of the transmitting primary axis is a primary axis direction D. Polarized light whose polarization direction is parallel to the primary axis direction D can pass through the linear polarizer 11. The phase retarder 12 is a quarter wave plate, and an included angle between an optical axis direction of the phase retarder 12 and the primary axis direction D is 45 degrees. The liquid crystal layer 13 is formed by injecting twisted nematic liquid crystals (TNLC) between two conductive and transparent substrates, such that the liquid crystals can be turned into a twisted arrangement or an arrangement perpendicular to the substrates through whether an electric field is applied to the liquid crystals or not. For example, when the twisted nematic liquid crystals of the liquid crystal layer 13 are positive liquid crystals, the absence of the electric field can cause the liquid crystals to present the twisted arrangement, while the application of the electric field can cause the liquid crystals to arrange perpendicular to the substrates. On the contrary, when the twisted nematic liquid crystals of the liquid crystal layer 13 are negative liquid crystals, the application of the electric field can cause the liquid crystals to present the twisted arrangement, while the absence of the electric field can cause the liquid crystals to arrange perpendicular to the substrates. The present invention is not limited in this regard.

The reflective layer 2 is formed by injecting a liquid crystal material between two transparent substrates, the liquid crystal material is cholesteric liquid crystal doped with polymerized palmar monomer, and the reflective layer 2 reflects light with broadband spectrum through a spiral structure with a gradual pitch. In addition, the refractive indices between the liquid crystal material and the polymer thereof do not match, which will result in a non-directional diffuse reflection. Furthermore, the spiral structure of the reflective layer 2 has a spiral direction T. When a circularly polarized light is incident on the reflective layer 2, if a rotation direction of a circularly polarized light is the same as the spiral direction T, the circularly polarized light performs diffuse reflection. On the contrary, if a rotation direction of a circularly polarized light is opposite to the spiral direction T, the circularly polarized light passes through the reflective layer 2.

Figure 2A:
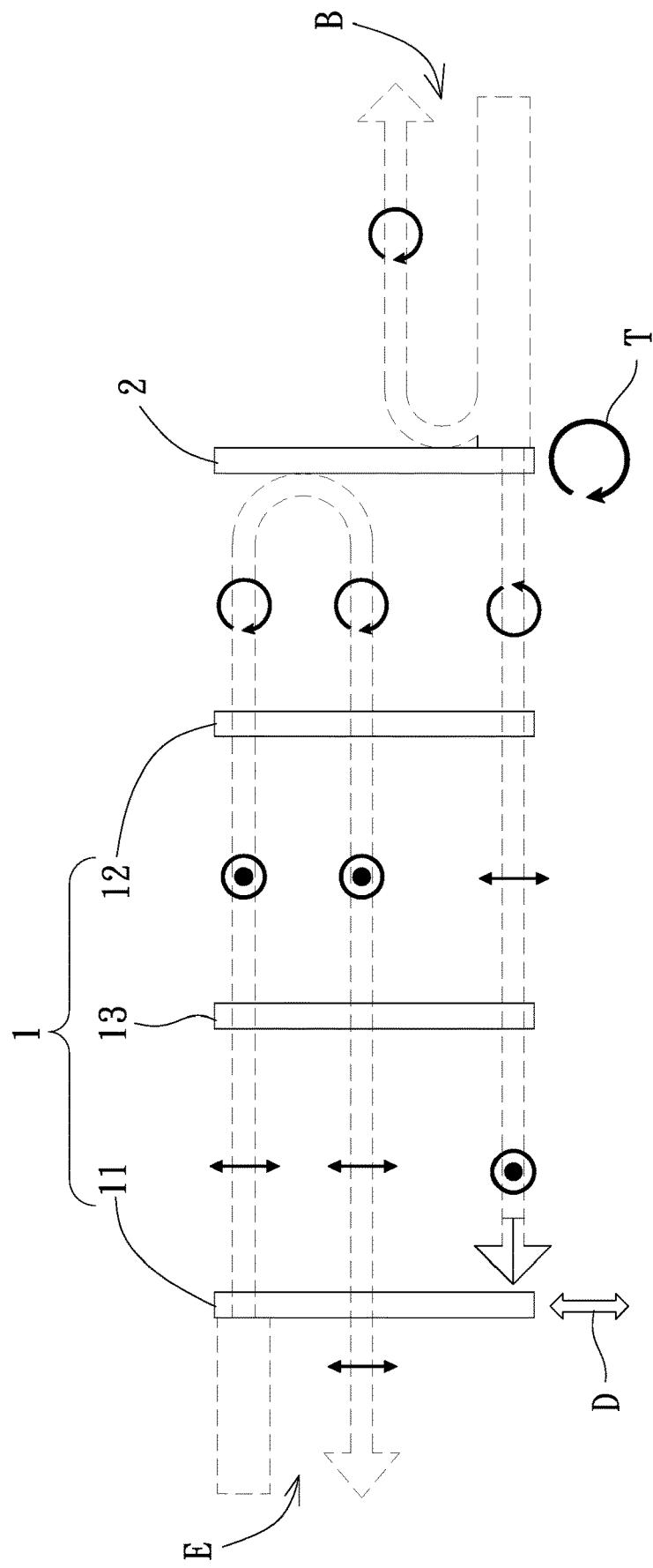
FIG. 2a is a diagram of light transformation situation in a projection state according to a preferred embodiment of the present invention.
Figure 2B:
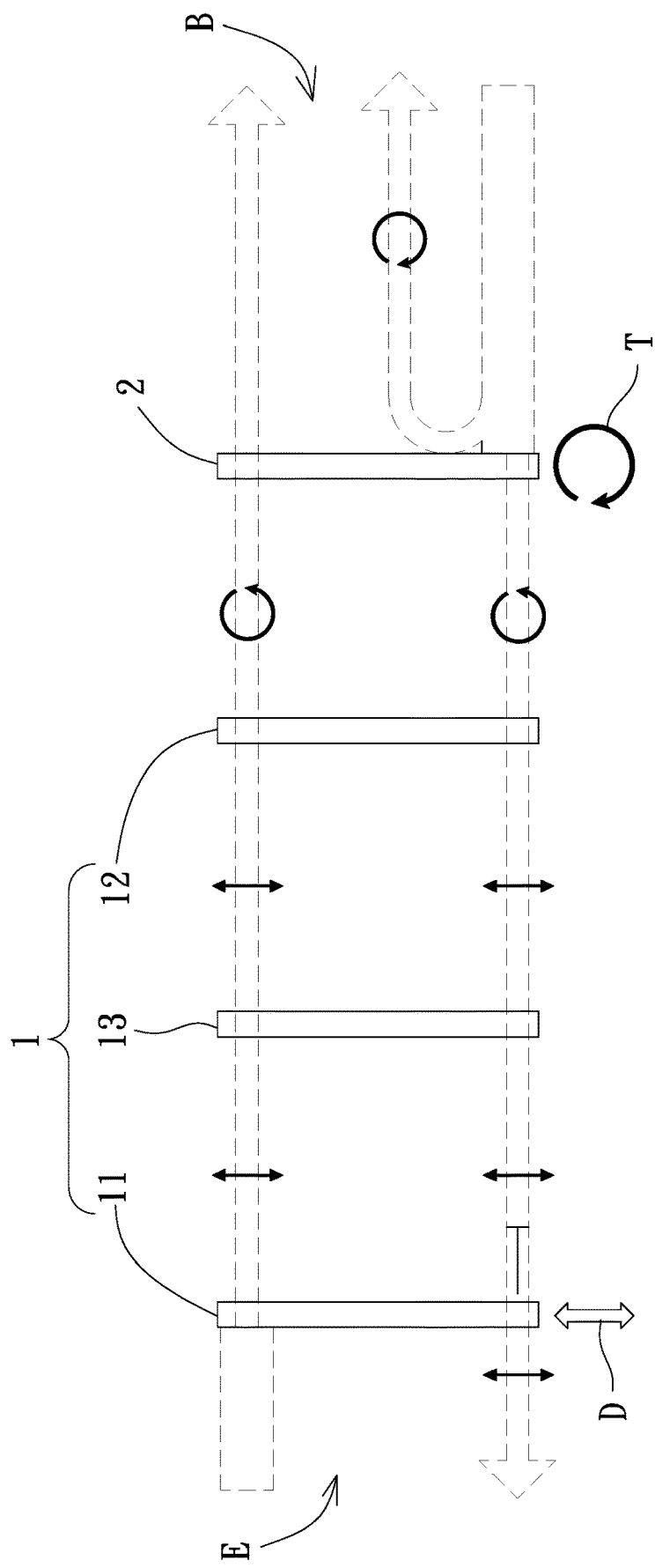
FIG. 2b is a diagram of light transformation situation in a transparent state according to a preferred embodiment of the present invention.

Please refer to FIGS. 2a and 2b. The projection light E is first incident on the linear polarizer 11 of the polarization modulator 1. Among the projection light E, only the linearly polarized light whose polarization direction is parallel to the primary axis direction D can pass through the linear polarizer 11 and then enter the liquid crystal layer 13.

As shown in FIG. 2a, when the liquid crystals of the liquid crystal layer 13 are in the twisted arrangement, the polarization direction of the linearly polarized light transformed from the projection light E is rotated by 90 degrees on the liquid crystal layer 13 to form a linearly polarized light whose polarization direction is perpendicular to the primary axis direction D, and the linearly polarized light enters the phase retarder 12 after passing through the liquid crystal layer 13. As shown in FIG. 2b, when the liquid crystals of the liquid crystal layer 13 are in the arrangement perpendicular to the substrates, the polarization direction of the linearly polarized light will not be changed by the liquid crystal layer 13, so that the polarization direction of the linearly polarized light is still parallel to the primary axis direction D, and the linearly polarized light enters the phase retarder 12 after passing through the liquid crystal layer 13.

As shown in FIG. 2a, since the optical axis direction of the phase retarder 12 and the primary axis direction D have an included angle of 45 degrees, the linearly polarized light whose polarization direction is perpendicular to the primary axis direction D passes through the phase retarder 12 to form a right-handed circularly polarized light. In addition, as shown in FIG. 2b, the linearly polarized light whose polarization direction is parallel to the primary axis direction D passes through the phase retarder 12 to form a left-handed circularly polarized light.

Please refer to FIGS. 2a and 2b. In this embodiment, the spiral direction T of the reflective layer 2 rotates clockwise (right-handed rotation). However, the present invention is not limited in this regard. As shown in FIG. 2a, the projection light E passes through the polarization modulator 1 and is transformed into the right-handed circularly polarized light, which is the same as the spiral direction T of the reflective layer 2, resulting in the diffuse reflection of the projection light E on the reflective layer 2, and reversely passes through the polarization modulator 1 along the original path, and emits in the form of linearly polarized light to form a reflection image. In addition, as shown in FIG. 2b, the projection light E passes through the polarization modulator 1 and is transformed into a left-handed circularly polarized light, which is opposite to the spiral direction T of the reflective layer 2, causing the projection light E to pass through the reflective layer 2.

Furthermore, in this embodiment, the background light B is incident on the reflective layer 2, a right-handed circularly polarized light of the background light B is reflected by the reflective layer 2, while a left-handed circularly polarized light of the background light B passes through the reflective layer 2 and then enters the polarization modulator 1. As shown in FIG. 2a, the left-handed circularly polarized light of the background light B is sequentially transformed by the phase retarder 12 into linearly polarized light whose polarization direction is parallel to the primary axis direction D, and transformed by the liquid crystal layer 13 into linearly polarized light whose polarization direction is perpendicular to the primary axis direction D, which is finally absorbed and blocked by the linear polarizer 11 and cannot be emitted. Thus, the background light B cannot be transmitted and the projection light E can be reflected to display the image in the projection state. In addition, as shown in FIG. 2b, the linearly polarized light transformed by the background light B will not be changed by the liquid crystal layer 13 with the arrangement perpendicular to the substrates of the liquid crystals, so that the linearly polarized light whose polarization direction is parallel to the primary axis direction D can be maintained and pass through the linear polarizer 11, thereby both the background light B and the projection light E are in a transparent state capable of bidirectional transmission.

Figure 3:
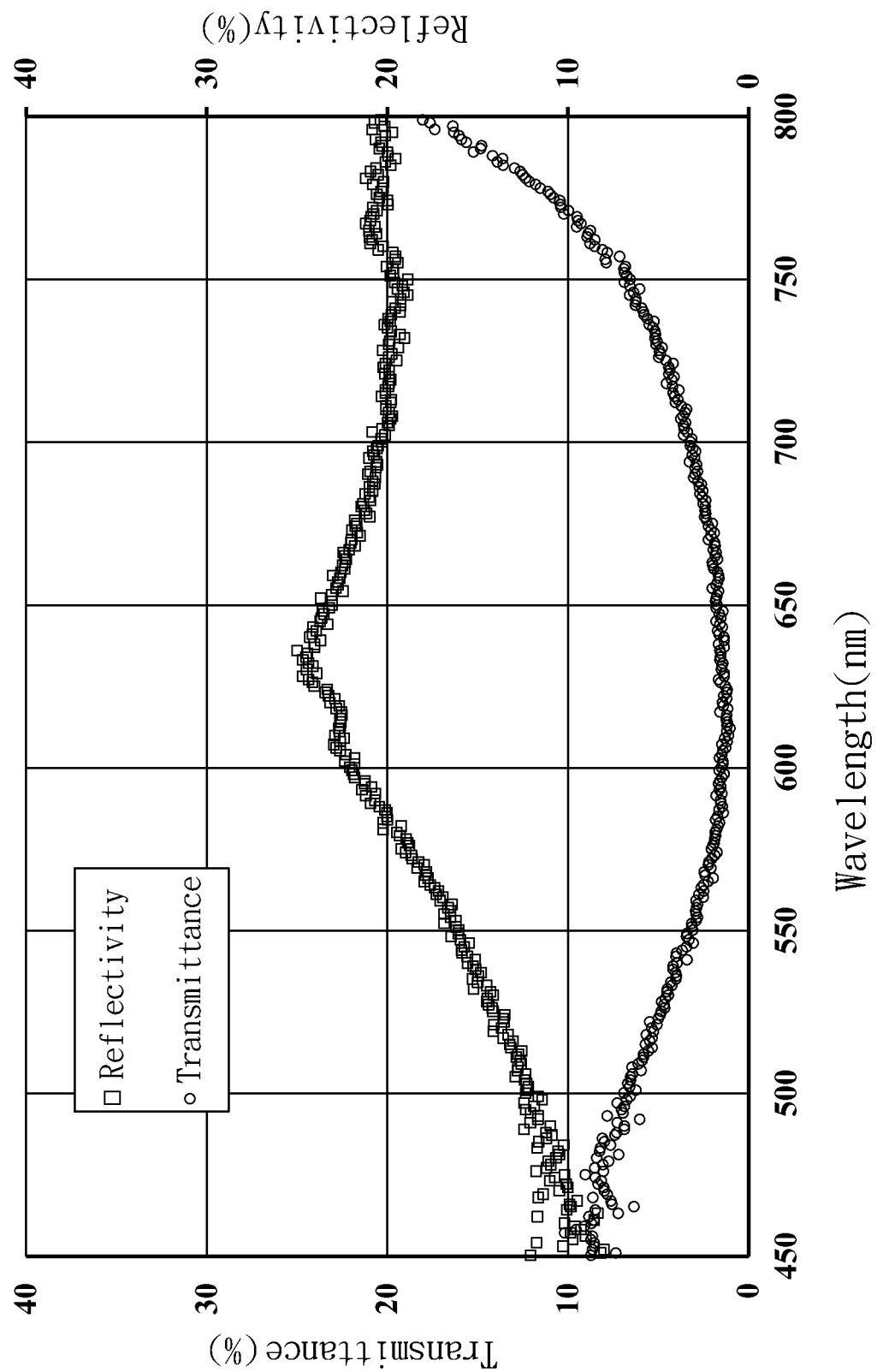
FIG. 3 is a spectrum diagram of reflected and transmitted light in a projection state according to a preferred embodiment of the present invention.

Please refer to FIG. 3, which is a spectrum diagram of reflected and transmitted lights in a projection state of a projection type transparent display according to the present invention. The average reflectivity of each of the lights within the visible light wavelength range that can be reflected and imaged is about 20%, and the average transmittance is about 5%. It can be seen that in the process of projection imaging, the projection type transparent display of the present invention can be used as a reflective screen to reflect the visible light image and reduce the background light interference, so as to improve the image quality.

Figure 4:
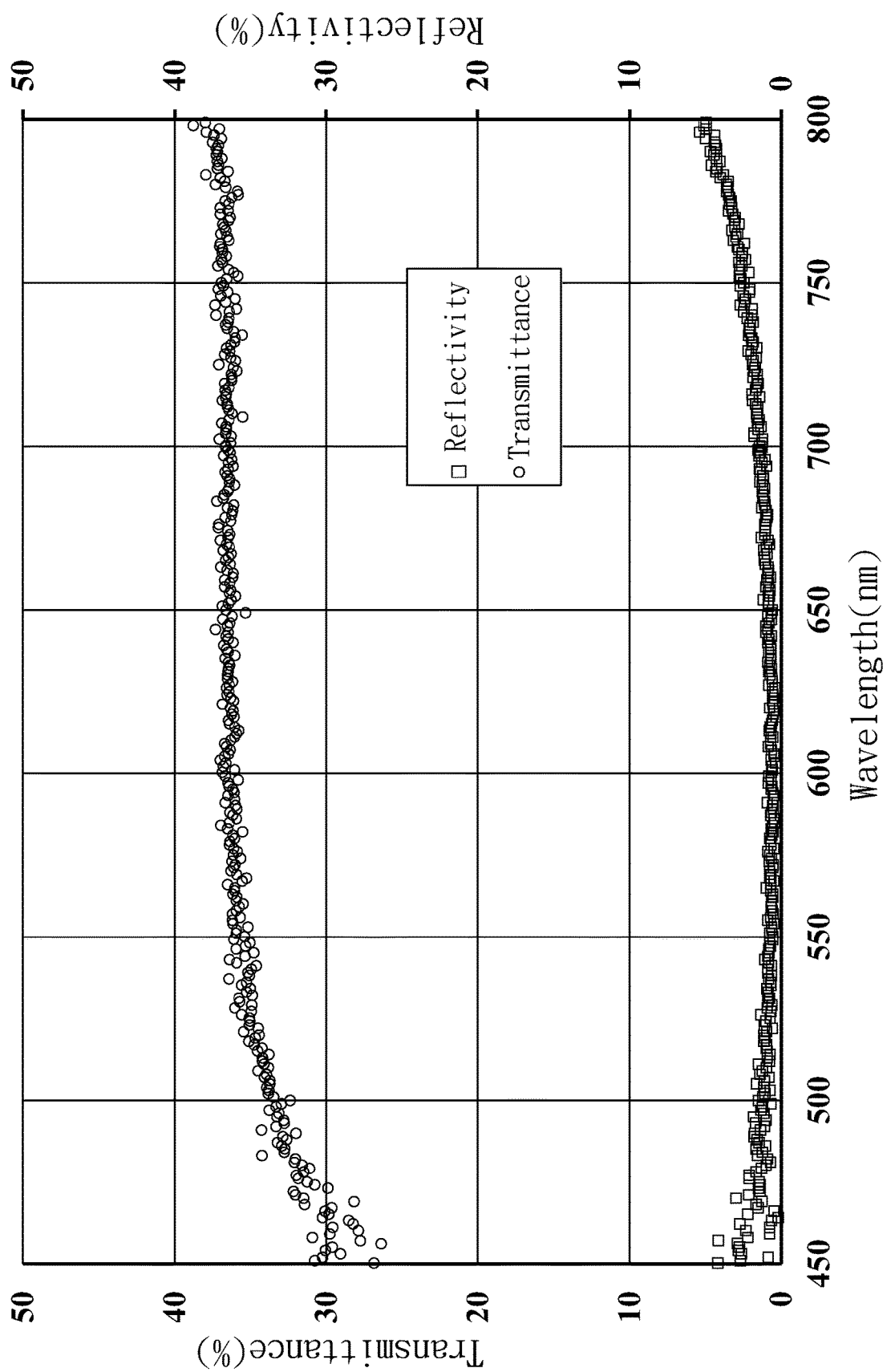
FIG. 4 is a spectrum diagram of reflected and transmitted light in a transparent state according to a preferred embodiment of the present invention.

Please refer to FIG. 4, which is a spectrum diagram of reflected and transmitted lights in a transparent state of the projection type transparent display according to the present invention. The transmittance of each of the lights within the visible light wavelength range is between 30% and 40%, and the reflectivity is reduced to less than 5%. Thus, the effect of making both directions clear and transparent can be achieved.

In summary, the projection type transparent display of the present invention is carried out by switching the rotation direction of the circularly polarized light transformed from the projection light that has been adjusted by the polarization modulator, then by limiting the spiral direction of the reflective layer, the projection light can be switched between the reflection and transmission states, and corresponding to the shielding and transmission states of the background light. Thus, the projection state of shielding the interference of the background light and the transparent state of bidirectional clear and transparent glass effect can be simply controlled during the reflective projection imaging, without the need to use surface microstructure, special optical film or semi-transmissive and semi-reflective structure, etc., thereby achieving the effects of easy operation, reducing manufacturing cost and improving image quality.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A projection type transparent display comprising:
   a polarization modulator stacked in sequence by a linear polarizer, a liquid crystal layer and a phase retarder, wherein a projection light is incident on the linear polarizer to form a linearly polarized light, and the liquid crystal layer changes a polarization direction of the linearly polarized light, through whether an electric field is applied to the liquid crystal layer or not, two kinds of linearly polarized projection lights with polarization directions orthogonal to each other are respectively formed, wherein the two kinds of linearly polarized projection lights pass through the phase retarder to respectively form two kinds of circularly polarized projection lights with opposite rotation directions; and a reflective layer stacked on the phase retarder of the polarization modulator, wherein the reflective layer has a spiral structure with a spiral direction, the two kinds of circularly polarized projection lights transformed from the projection light are incident on the reflective layer, a reflection is performed when the rotation direction of the circularly polarized projection light is the same as the spiral direction, wherein the reflective layer is transmitted when the rotation direction of the circularly polarized projection light is opposite to the spiral direction, wherein a background light is incident on the reflective layer, a circularly polarized background light with the same spiral direction is reflected, and a circularly polarized background light opposite to the spiral direction passes through the reflective layer and is incident on the polarization modulator, through whether an electric field is applied to the liquid crystal layer or not, two kinds of linearly polarized background lights with polarization directions orthogonal to each other are respectively formed, wherein one of the two kinds of linearly polarized background lights is absorbed by the linear polarizer and another one of the two kinds of linearly polarized background lights passes through the linear polarizer.

2. The projection type transparent display as claimed in claim 1, wherein an extension direction of a transmitting primary axis of the linear polarizer is a primary axis direction, the phase retarder is a quarter wave plate and an included angle between an optical axis direction of the phase retarder and the primary axis direction is 45 degrees.

3. The projection type transparent display as claimed in claim 1, wherein the liquid crystal layer is formed by two conductive and transparent substrates sandwiching twisted nematic liquid crystals, and a switchable electric field is applied between the two substrates.

4. The projection type transparent display as claimed in claim 3, wherein the twisted nematic liquid crystals of the liquid crystal layer are positive liquid crystals, an absence of the electric field causes the liquid crystal to present a twisted arrangement, while an application of the electric field causes the liquid crystals to arrange perpendicular to each of the substrates.

5. The projection type transparent display as claimed in claim 3, wherein the twisted nematic liquid crystals of the liquid crystal layer are negative liquid crystals, an application of the electric field causes the liquid crystals to present a twisted arrangement, while an absence of the electric field causes the liquid crystals to arrange perpendicular to each of the substrates.

6. The projection type transparent display as claimed in claim 1, wherein the reflective layer is formed by injecting a liquid crystal material between two transparent substrates, and the spiral structure has a gradual pitch.

7. The projection type transparent display as claimed in claim 6, wherein the liquid crystal material is cholesteric liquid crystal doped with polymerized palmar monomer, and refractive indices between the liquid crystal material and the polymer thereof do not match.

8. The projection type transparent display as claimed in claim 1, wherein the polarization modulator transforms the rotation direction of the circularly polarized projection light to be the same as the spiral direction, the circularly polarized projection light is reflected by the reflective layer and the background light is absorbed by the linear polarizer, resulting in a projection state.

9. The projection type transparent display as claimed in claim 1, wherein the polarization modulator transforms the rotation direction of the circularly polarized projection light to be opposite to the spiral direction, the circularly polarized projection light passes through the reflective layer and the background light passes through the linear polarizer, resulting in a transparent state.

* * * * *